United States Patent
Noda

(10) Patent No.: US 8,355,594 B2
(45) Date of Patent: Jan. 15, 2013

(54) INFORMATION PROCESSING APPARATUS, LINE NOISE REDUCTION PROCESSING METHOD, AND COMPUTER-READABLE STORAGE MEDIUM

(75) Inventor: Takeshi Noda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/834,230

(22) Filed: Jul. 12, 2010

(65) Prior Publication Data

US 2011/0019933 A1 Jan. 27, 2011

(30) Foreign Application Priority Data

Jul. 27, 2009 (JP) ................... 2009-174742

(51) Int. Cl.
*G06K 9/40* (2006.01)
(52) U.S. Cl. ....... 382/260; 382/274; 382/275; 358/3.26; 358/3.27
(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 6,819,740 | B2 | 11/2004 | Takahashi et al. | 378/98.8 |
| 7,027,054 | B1 * | 4/2006 | Cheiky et al. | 345/473 |
| 7,149,355 | B2 * | 12/2006 | Kubota | 382/199 |
| 7,155,069 | B2 * | 12/2006 | Ishizaka | 382/298 |
| 7,184,041 | B2 * | 2/2007 | Heng et al. | 345/424 |
| 7,418,131 | B2 * | 8/2008 | Wang et al. | 382/165 |

FOREIGN PATENT DOCUMENTS

JP 2003-204955 7/2003

* cited by examiner

*Primary Examiner* — Yosef Kassa
(74) *Attorney, Agent, or Firm* — Fitzpatrick, Cella, Harper & Scinto

(57) ABSTRACT

An information processing apparatus performs first filter processing to combine pixels of an image along a predetermined direction. A line noise image is extracted by executing second filter processing for the processed image along a direction different from the predetermined direction. The extracted line noise image is subtracted from the image to acquire a line noise reduced image.

10 Claims, 5 Drawing Sheets

F I G. 2
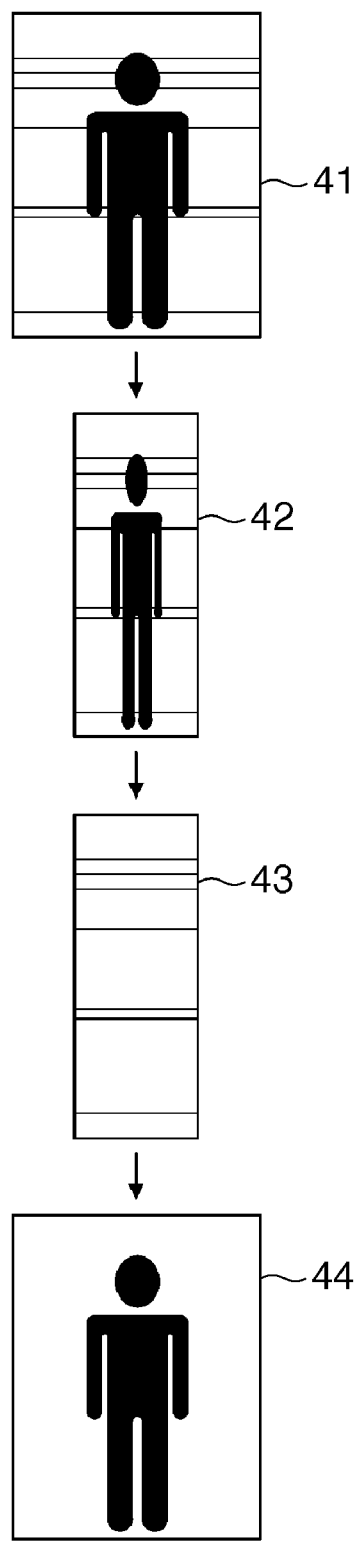

INFORMATION PROCESSING APPARATUS, LINE NOISE REDUCTION PROCESSING METHOD, AND COMPUTER-READABLE STORAGE MEDIUM

BACKGROUND OF THE INVENTION

1. Field of the Invention

The present invention relates to an information processing apparatus, line noise reduction processing method, and computer-readable storage medium.

2. Description of the Related Art

Diagnoses and treatments based on (moving image) imaging using radiation (for example, X-rays) have been brisk. Recently, an X-ray imaging apparatus using a flat panel detector (in which an amorphous silicon TFT and a semiconductor sensor are formed on a glass substrate) is especially often used. However, the flat panel detector that uses an amorphous silicon TFT cannot amplify a photoelectrically converted signal in a pixel. Instead, accumulated charges are read out via a long signal line. For this reason, noise is readily generated in an image due to the influence of external or internal factors.

Imaging using radiation needs to be done in a low dose to reduce radiation exposure of a human body. Hence, a read signal has a very small value, and only a slight fluctuation in an image is visually recognized. Particularly, stripe-shaped unevenness (to be referred to as line noise hereinafter) running in the vertical or horizontal direction greatly influences a diagnostic image because it is sensitively detected by the human eye.

Conventionally, a technique disclosed in Japanese Patent Laid-Open No. 2003-204955 (to be referred to as reference 1 hereinafter) is known as a line noise reduction method. The method of reference 1 performs high-pass filter processing of an original image containing line noise in a direction perpendicular to the line noise. The processed image then undergoes low-pass filter processing in the horizontal direction. A line noise image is consequently acquired. The line noise image is subtracted from the original image. This allows to reduce the line noise.

The method of reference 1 uses a low-pass filter to remove an object extracted by a high-pass filter. In this case, however, object removal is insufficient, resulting in an edge blur or artifact in the object.

Furthermore, the techniques of reference 1 needs filter processing of all pixels. Since image processing takes time, these methods are not suitable for, for example, a moving image in fluorography.

SUMMARY OF THE INVENTION

The present invention provides a technique capable of quickly and efficiently removing line noise without any influence of random noise or an object.

According to a first aspect of the present invention there is provided an information processing apparatus comprising: a processing unit configured to perform first filter processing to combine pixels of an image along a predetermined direction; an extraction unit configured to extract a line noise image by executing second filter processing for the processed image along a direction different from the predetermined direction; and a difference processing unit configured to subtract, from the image, the line noise image extracted by the extraction unit so as to acquire a line noise reduced image.

According to a second aspect of the present invention there is provided a line noise reduction processing method of an information processing apparatus, comprising: performing first filter processing to combine pixels of an image along a predetermined direction; extracting a line noise image by executing second filter processing for the processed image along a direction different from the predetermined direction; and subtracting, from the image, the line noise image extracted by the extraction unit so as to acquire a line noise reduced image.

According to a third aspect of the present invention there is provided a computer-readable storage medium storing a program which causes a computer to function as: a processing unit configured to perform first filter processing to combine pixels of an image along a predetermined direction; an extraction unit configured to extract a line noise image by executing second filter processing for the processed image along a direction different from the predetermined direction; and a difference processing unit configured to subtract, from the image, the line noise image extracted by the extraction unit so as to acquire a line noise reduced image.

Further features of the present invention will be apparent from the following description of exemplary embodiments with reference to the attached drawings.

BRIEF DESCRIPTION OF THE DRAWINGS

FIG. 2 is a view showing an outline of line noise removal processing according to the embodiment;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
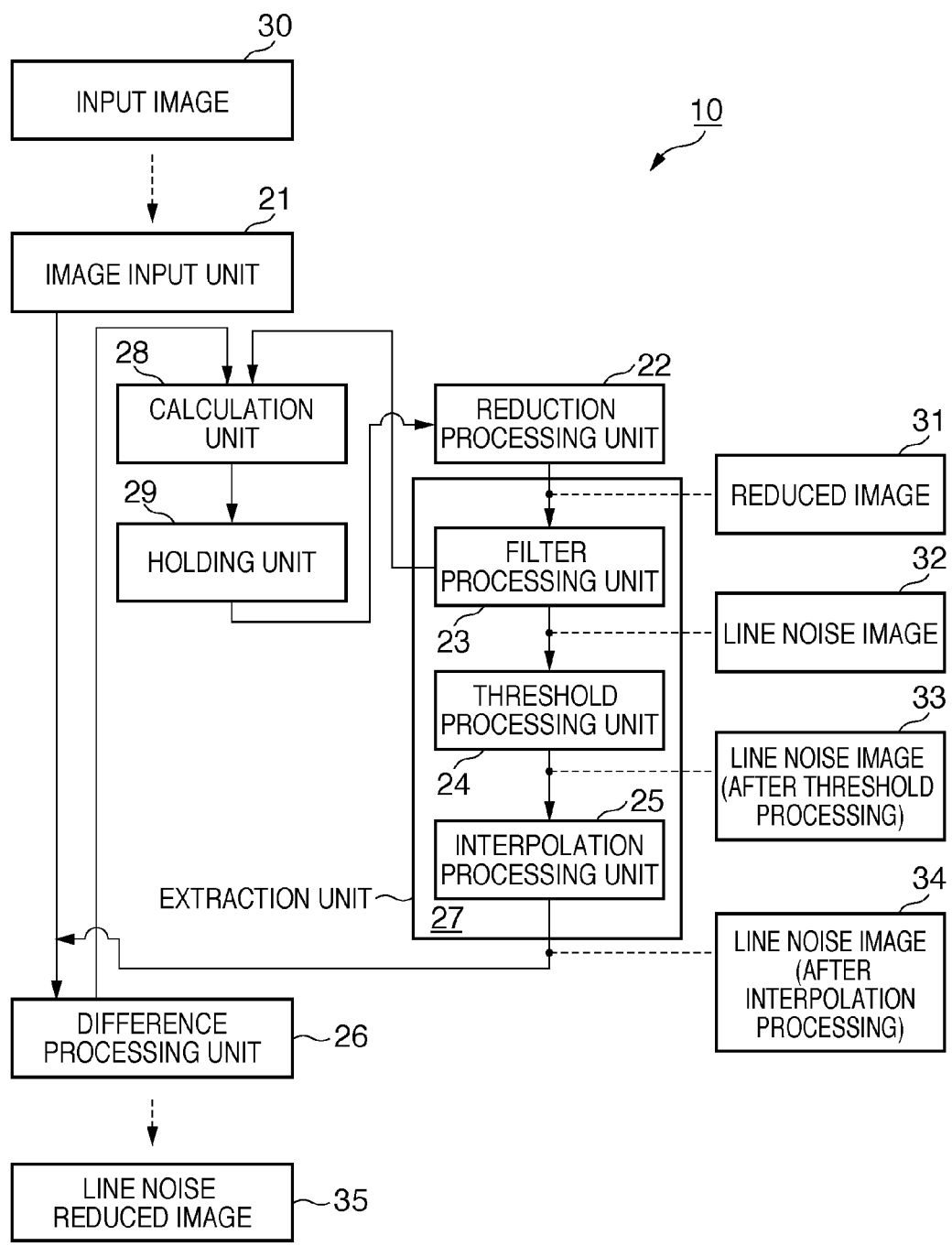
FIG. 1 is a block diagram showing an example of the functional arrangement of an information processing apparatus according to an embodiment of the present invention.

FIG. 1 is a block diagram showing an example of the functional arrangement of an information processing apparatus according to an embodiment of the present invention.

An information processing apparatus 10 includes one or a plurality of computers. The computer includes, for example, a main control unit such as a CPU, and storage units such as a ROM (Read Only Memory) and a RAM (Random Access Memory). The computer may also include a communication unit such as a network card, and input/output units such as a keyboard and a display or a touch panel. Note that these constituent units are connected via a bus or the like and controlled by causing the main control unit to execute programs stored in the storage unit.

The information processing apparatus 10 includes, as functional components, an image input unit 21, reduction processing unit 22, extraction unit 27, threshold processing unit 24, interpolation processing unit 25, difference processing unit 26, calculation unit 28, and holding unit 29.

The image input unit 21 externally inputs an image (to be referred to as an input image hereinafter). An input image 30 is a two-dimensional image formed from, for example, n horizontal pixels×m vertical pixels. The input image 30 according to this embodiment contains an object and line noise in a predetermined direction (stripe-shaped unevenness running in the vertical or horizontal direction), as indicated by 41 in FIG. 2. Note that in this embodiment, the predetermined direction is the horizontal direction, and an example in which line noise appears in the horizontal direction will be described. However, the predetermined direction may be the vertical direction, as a matter of course. The two-dimensional image is obtained by X-rays. However, the image need not always be obtained by X-rays.

The reduction processing unit 22 reduces the input image 30 in a predetermined direction (the same direction as that of line noise) (first filter processing). More specifically, the pixels in the image (input image 30) are linearly combined along the predetermined direction (the horizontal direction in this embodiment). Note that the unit of the number of pixels to be combined by linear combination is held in the holding unit 29. The reduction processing unit 22 performs linear combination based on the value held in the holding unit 29. In the linear combination, the input image 30 is reduced in the horizontal direction by using, for example, the average value of k (k≧2) pixels as the value of one pixel. With this processing, a horizontally reduced image indicated by 42 in FIG. 2 is obtained. The reduction processing is not limited to the above-described method, and a generally known method may be used. Note that the number of pixels to be combined need not always be uniform. Since the reduction processing suppresses random noise, it is possible to efficiently perform line noise component extraction (edge-exclusion high-pass filter processing). The number of pixels that undergo the filter processing decreases to n/k. This allows to shorten the processing time of the extraction unit 27 of the succeeding stage.

The extraction unit 27 extracts a line noise (image) 32 from a reduced image 31. The extraction unit 27 includes a filter processing unit 23, the threshold processing unit 24, and the interpolation processing unit 25. The filter processing unit 23 performs, for example, edge-exclusion high-pass filter processing (second filter processing) for the image reduced by the reduction processing unit 22, thereby extracting line noise. The edge-exclusion high-pass filter processing is performed in a direction (the vertical direction in this embodiment) perpendicular to the direction in which the line noise appears. Note that the filter processing need not always be done in the perpendicular direction. More specifically, the direction need not accurately be perpendicular to the direction in which the line noise appears, and the filter processing is performed along a direction with a margin in a predetermined range. With this filter processing, the line noise image 32 as indicated by 43 in FIG. 2 is obtained by removing the object from the reduced image 31. Note that the edge-exclusion high-pass filter according to this embodiment indicates a nonlinear high-pass filter which changes the coefficients depending on data and makes it difficult to extract an edge. For example, there is a filter such as an ϵ filter whose filter coefficients change depending on data. An edge-exclusion high-pass ϵ filter can be represented by $$Iout(i) = \sum_{j=-h}^{h} \frac{1}{r\sqrt{\pi}} \exp\left(-\frac{j^2}{r^2}\right) F(I(i) - I(i+j)) \quad (1)$$

for $$F(p) = p \text{ for } |p| < \varepsilon$$

$$F(p) = 0 \text{ for } |p| \geq \varepsilon$$

where I(i) is a pixel value before filter processing, Iout(i) is a pixel value after filter processing, r is the Gaussian radius that determines the frequency characteristic of the filter, and h is the order of the filter.

As described above, the ϵ filter is a data-dependent filter. As its characteristic feature, if the difference between the pixel of interest and a neighboring pixel is larger than ϵ, the filter coefficient for the neighboring pixel is made small. This allows to remove a contrast signal equal to or more than the ϵ value. Note that, for example, a dispersive filter, MTM filter, and bilateral filter are also known as data-dependent filters. An edge-exclusion high-pass filter may be formed using these filters.

The threshold processing unit 24 executes threshold processing for the line noise image 32 in a predetermined direction (the same direction as that of line noise). The line noise has strong correlation in the horizontal direction. Hence, the threshold processing unit 24 compares the pixels in the horizontal direction. If one of pixels arranged in the horizontal direction exhibits a prominent value, the pixel is not a line noise component at a high probability (for example, object). Hence, the pixel is removed. More specifically, the threshold processing unit 24 obtains the standard deviation and average value of the pixels in the horizontal direction. A pixel deviated from the average value by the standard deviation or more (beyond a predetermined threshold) is determined to be the object and removed from the line noise image 32. With this processing, a line noise image (after threshold processing) 33 is obtained by more accurate object removal.

The interpolation processing unit 25 executes pixel interpolation processing for the line noise image (after threshold processing) 33. That is, the interpolation processing unit 25 interpolates pixels lost by the processing of the threshold processing unit 24. The line noise has strong correlation in the horizontal direction. Hence, interpolation is performed using, for example, adjacent pixels in the horizontal direction. With this processing, a line noise image (after interpolation processing) 34 as indicated by 43 in FIG. 2 is obtained.

The difference processing unit 26 calculates the difference between the input image 30 and the line noise image (after interpolation processing) 34. More specifically, the difference processing unit 26 subtracts the line noise image (after interpolation processing) 34 indicated by 43 in FIG. 2 from the input image 30 indicated by 41 in FIG. 2. With this processing, a line noise reduced image 35 indicated by 44 in FIG. 2 is acquired. The line noise image (after interpolation processing) 34 for the difference processing has been reduced in the horizontal direction. However, since the line noise has strong correlation in the horizontal direction, as described above, no problem particularly arises concerning the accuracy of subtraction processing when corresponding pixels are subtracted from the pixels of the input image 30 used for reduction.

Alternatively, the above-described difference processing may be performed after enlarging the reduced image to the size of the input image 30 using generally known interpolation, that is, approximation. If the input image 30 includes regions segmented by pattern recognition or object recognition, and each region has corresponding attribute information, the weight in line noise image subtraction may be changed in accordance with the information. For example, the weight is set to 1.0 for a region outside the irradiation field or a non-object portion and to 0.7 for an object portion. This enables to decrease errors in the image even if the object is erroneously extracted upon creating the line noise image.

The calculation unit 28 calculates the number of pixels to be combined in linear combination (by the reduction processing unit 22). The calculation unit 28 calculates the number of pixels based on random noise standard deviation and line noise standard deviation. Note that the calculation processing will be described later in detail. The holding unit 29 holds the calculated value. The calculation processing by the calculation unit 28 is performed in, for example, initial setting, device calibration, or the like. In subsequent processing, linear combination is done based on the value held in the holding unit 29 in advance. Note that a serviceman or the like may input a solid line noise image in initial setting or device calibration, and analyze the output result to determine the optimum number of linear combination pixels. In this case, the holding unit 29 holds a value input by the serviceman or the like.

An example of the procedure of line noise reduction processing in the information processing apparatus 10 shown in FIG. 1 will be described with reference to FIG. 3.

The information processing apparatus 10 causes the image input unit 21 to externally input the image (input image) 30 (S101), thereby starting the processing. Note that image input can be done via a network or the like or via a storage medium such as a memory card. The method is not particularly limited.

When the image is input, the information processing apparatus 10 causes the reduction processing unit 22 to reduce the input image 30 in the horizontal direction (S102). As described above, for example, the average value of k pixels is defined as the value of one pixel, thereby reducing the input image 30 in the horizontal direction. As a result, the input image 30 is reduced to, for example, n/k in the horizontal direction. Random noise (noise in each pixel) representing the degree of variation in each pixel is reduced to $1/\sqrt{k}$. Line noise components having strong correlation in the horizontal direction are preserved.

Next, the information processing apparatus 10 causes the filter processing unit 23 to execute filter processing, thereby extracting the line noise (image) 32 from the obtained reduced image 31 (S103). The information processing apparatus 10 then causes the threshold processing unit 24 to execute threshold processing in the horizontal direction for the extracted line noise image 32 (S104).

After that, the information processing apparatus 10 causes the interpolation processing unit 25 to perform interpolation processing for the line noise image (after threshold processing) 33 (S105). That is, pixels removed from the line noise image by the processing in step S104 are interpolated. After the interpolation processing, the information processing apparatus 10 causes the difference processing unit 26 to calculate the difference between the input image 30 input in step S101 and the line noise image (after interpolation processing) 34. With this processing, the line noise reduced image 35 is obtained by subtracting the line noise from the input image 30.

Figure 3:
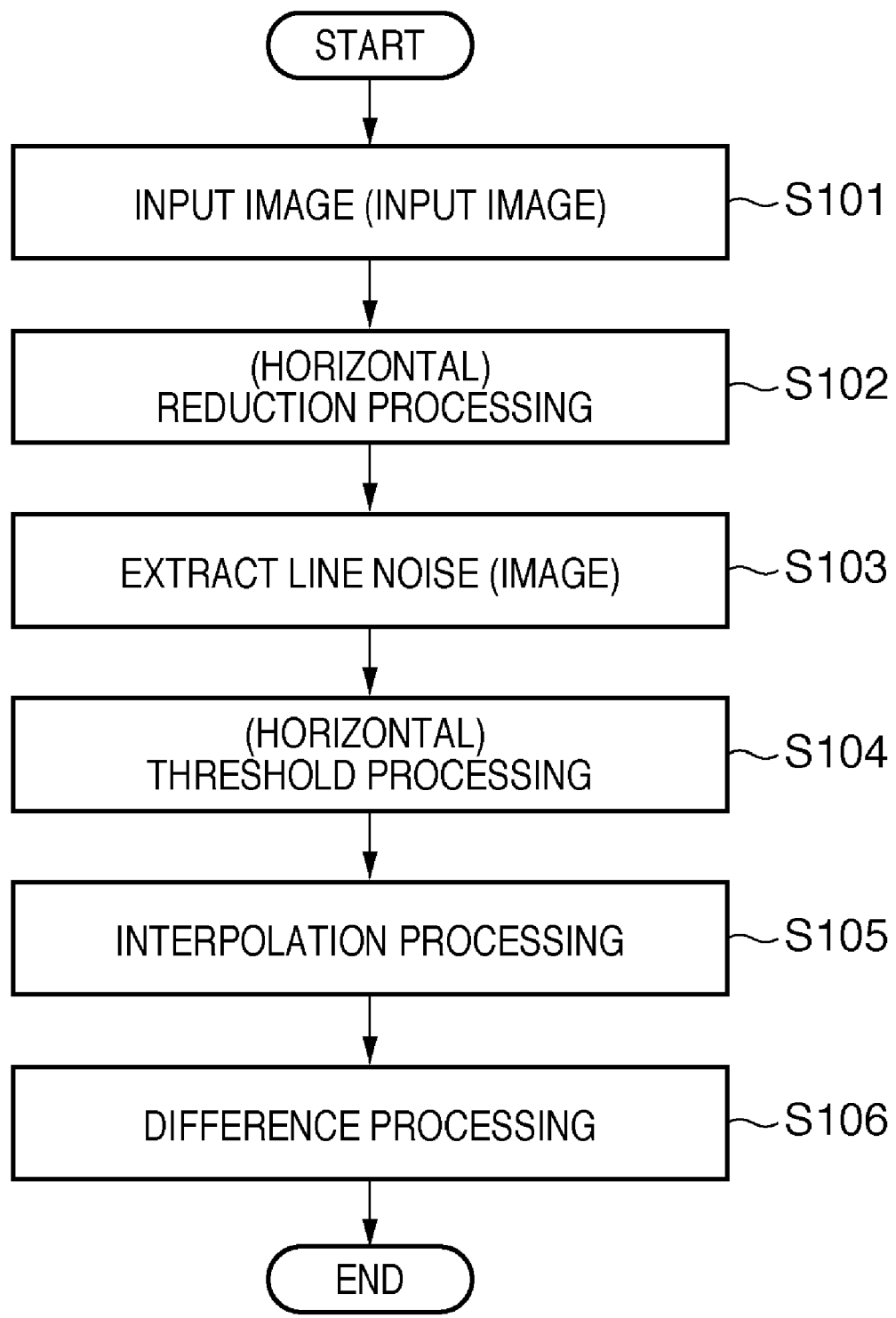
FIG. 3 is a flowchart illustrating an example of the procedure of line noise reduction processing.

Note that the procedure of the noise reduction processing shown in FIG. 3 is merely an example. The processing is appropriately changed in accordance with the process target image. For example, the threshold processing in step S104 or the interpolation processing in step S105 need not always be executed, and may be omitted.

An example of a line noise reduction effect obtained by executing the horizontal reduction processing (S102 in FIG. 3) will be described next with reference to FIG. 4.

Figure 4:
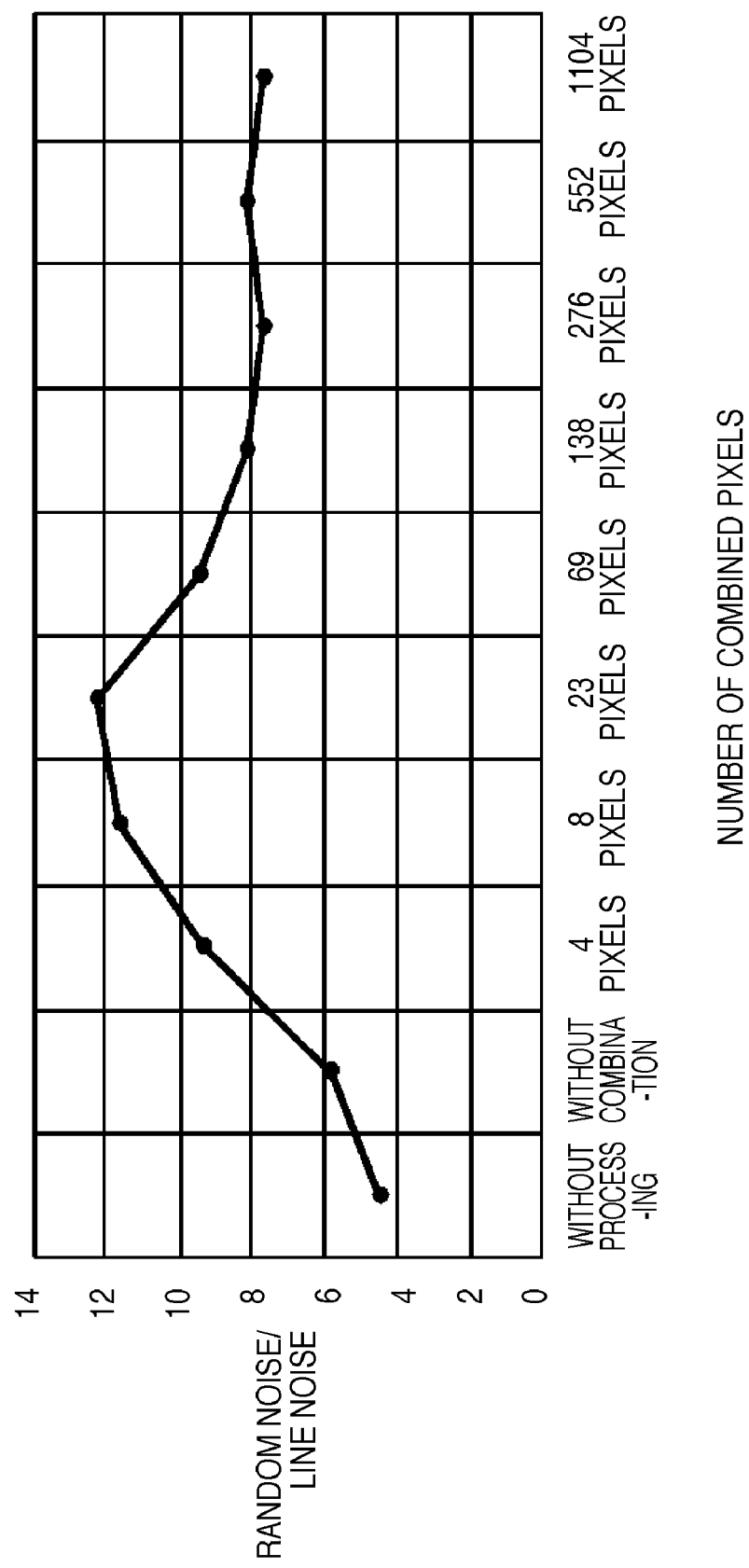
FIG. 4 is a graph showing an example of a line noise reduction effect according to the embodiment.

FIG. 4 is a graph illustrating an example of the relationship between the noise detection state and the number of combined pixels. The abscissa of the graph represents the unit of the number of pixels linearly combined by the horizontal reduction processing of the reduction processing unit 22. The ordinate represents a value (to be referred to as a random/line ratio hereinafter) obtained by dividing random noise standard deviation by line noise standard deviation. The random noise standard deviation is the standard deviation of each pixel in the line noise reduced image. The line noise standard deviation is a result obtained by, for example, combining the pixels in the horizontal direction by the above-described reduction processing, averaging the pixel values, and calculating the standard deviation in the vertical direction.

From the results of past subjective evaluation experiments, the line noise in the input image 30 is hardly visually recognized when the random/line ratio is 7 or more and, more preferably, 10 or more. As shown in FIG. 4, the random/line ratio is about 4 in an image (corresponding to the input image 30) which has not undergone noise reduction ("without processing" on the abscissa in FIG. 4). In an image which has undergone noise reduction processing without linear combination of pixels ("without combination" on the abscissa in FIG. 4), as in the prior art, the random/line ratio is about 6.

However, when the reduction processing unit 22 is provided to linearly combine pixels, and the resultant image (corresponding to the reduced image 31) undergoes the above-described noise reduction processing ("4 to 1104 pixels" on the abscissa in FIG. 4), as in this embodiment, a value larger than 7 is obtained as the random/line ratio. When the number of pixels to be combined in linear combination is adjusted in accordance with the uniformity and level of line noise, a value larger than 10 is obtained as the random/line ratio (for example, "8 pixels" and "23 pixels" on the abscissa in FIG. 4).

The edge of the object after the line noise reduction processing according to this embodiment will be described next with reference to FIGS. 5A and 5B.

Figure 5A:
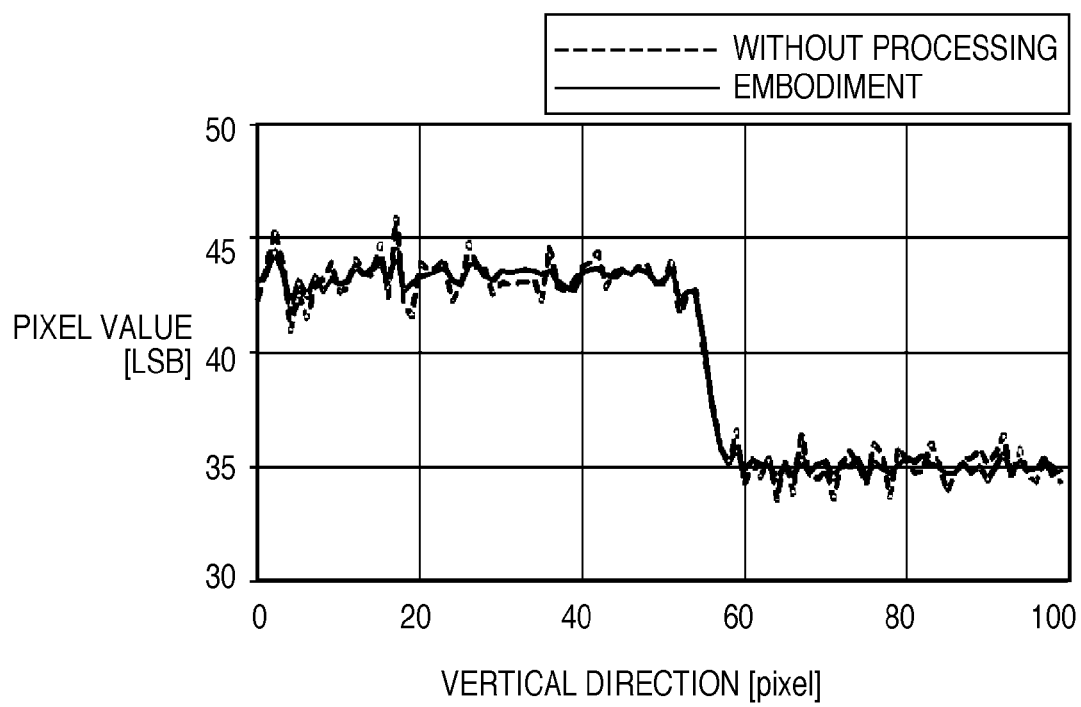
FIGS. 5A and 5B are graphs showing an example of a line noise reduction effect according to the embodiment.
Figure 5B:
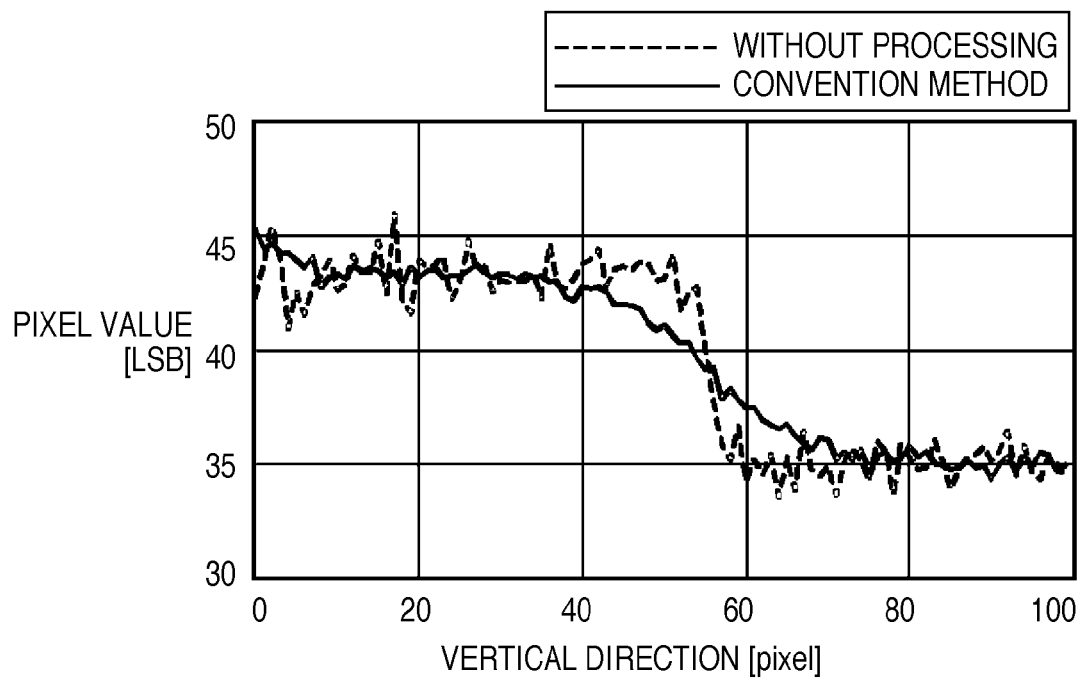

FIGS. 5A and 5B are graphs showing examples of vertical pixel positions and pixel values before and after the line noise reduction processing. For easier understanding of the effect of line noise reduction processing according to this embodiment, FIG. 5A shows vertical pixel positions and pixel values before and after the line noise reduction processing according to this embodiment, and FIG. 5B shows those in the conventional method.

The abscissa of each graph represents the vertical pixel position, and the ordinate represents the pixel value of the pixel.

Executing line noise reduction processing by the conventional method equals applying a low-pass filter in the vertical direction, resulting in an edge blur of the object, as shown in FIG. 5B. On the other hand, in this embodiment, the object and its edge portion are removed using an edge-exclusion high-pass filter to extract line noise. Hence, line noise can be reduced while ensuring the edge, as shown in FIG. 5A.

As described above, according to this embodiment, the pixels are linearly combined in the direction in which line noise runs. After that, filter processing is performed using an edge-exclusion high-pass filter. This makes it possible to more effectively reduce line noise than in the conventional method and suppress an artifact or edge blur in the processed image. Additionally, since filter processing is performed for a reduced image, the processing time can shorten. Furthermore, a moving image can undergo the processing with less processing load than before.

More specifically, according to this embodiment, it is possible to extract line noise without any influence of random noise or an object. This enables to reduce line noise and suppress an artifact or edge blur in an image as compared to a case in which the arrangement is not adopted. In addition, since filter processing is performed for a reduced image, the processing time can shorten.

A typical embodiment of the present invention has been described above. However, the present invention is not limited to the above-described and illustrated embodiment, and various changes and modifications can appropriately be made within the spirit and scope of the present invention.

For example, the present invention can take a form of, for example, a system, apparatus, method, program, or computer-readable storage medium. More specifically, the present invention is applicable to a system including a plurality of devices, or an apparatus including a single device.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-174742 filed on Jul. 27, 2009, which is hereby incorporated by reference herein in its entirety.

What is claimed is:

1. An information processing apparatus comprising:
   a processing unit configured to perform first filter processing to combine pixels of an image along a predetermined direction;
   an extraction unit configured to extract a line noise image by executing second filter processing for the processed image along a direction different from the predetermined direction; and
   a difference processing unit configured to subtract, from the image, the line noise image extracted by said extraction unit so as to acquire a line noise reduced image.

2. The apparatus according to claim 1, wherein said extraction unit comprises:
   a threshold processing unit configured to execute threshold processing for the extracted line noise image so as to remove, from the line noise image, a pixel whose value exceeds a predetermined threshold out of the pixels; and
   an interpolation processing unit configured to execute interpolation processing for a region of the removed pixel in the line noise image processed by said threshold processing unit.

3. The apparatus according to claim 2, wherein interpolation processing is performed to make a size of the extracted line noise image match with that of the image.

4. The apparatus according to claim 1, wherein
   the image has attribute information corresponding to each region in the image, and
   said difference processing unit performs the subtraction based on a weight based on the attribute information.

5. An apparatus according to claim 1, wherein the processing unit is configured to perform linear combination of pixels along the predetermined direction.

6. The apparatus according to claim 5, further comprising a holding unit configured to hold, in advance, the number of pixels for linear combination based on random noise standard deviation of each pixel in the line noise reduced image and line noise standard deviation calculated, along the direction different from the predetermined direction, from the line noise image extracted by said extraction unit,
   wherein said processing unit performs the first filter processing by performing linear combination along the predetermined direction based on the number of pixels held in said holding unit.

7. The apparatus according to claim 6, wherein the number of pixels for linear combination is determined to a value at which a value obtained by dividing the random noise standard deviation by the line noise standard deviation is not less than 7.

8. The apparatus according to claim 1, wherein the second filter processing is performed in a direction perpendicular to the predetermined direction using an edge-exclusion high-pass filter formed from one of an $\epsilon$ filter, a dispersive filter, an MTM filter, and a bilateral filter.

9. A line noise reduction processing method of an information processing apparatus, comprising:
   performing first filter processing to combine pixels of an image along a predetermined direction;
   extracting a line noise image by executing second filter processing for the processed image along a direction different from the predetermined direction; and
   subtracting, from the image, the line noise image extracted by the extraction unit so as to acquire a line noise reduced image.

10. A computer-readable storage medium storing a program which causes a computer to function as:
    a processing unit configured to perform first filter processing to combine pixels of an image along a predetermined direction;
    an extraction unit configured to extract a line noise image by executing second filter processing for the processed image along a direction different from the predetermined direction; and
    a difference processing unit configured to subtract, from the image, the line noise image extracted by said extraction unit so as to acquire a line noise reduced image.

* * * * *